Feb. 9, 1965     E. H. SCHUSTACK     3,168,779
METHOD OF ASSEMBLING PIPE COUPLINGS
Filed April 6, 1964     2 Sheets-Sheet 1
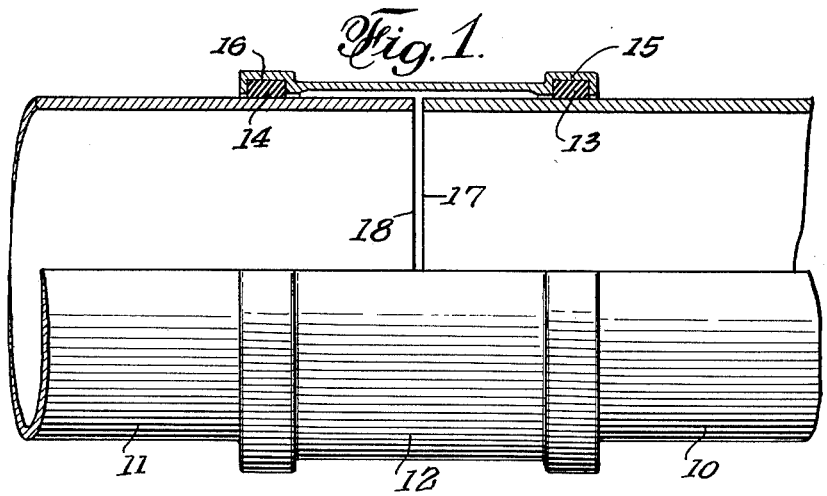
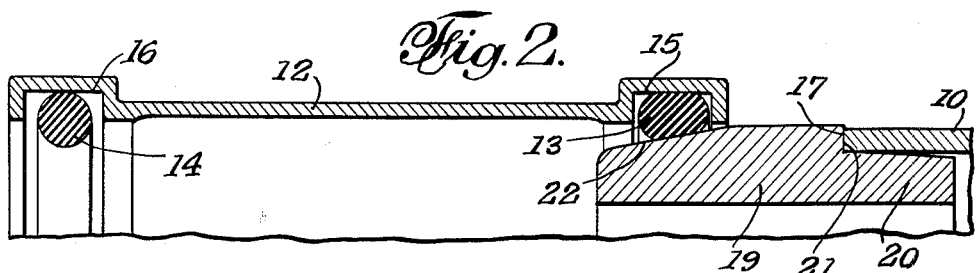
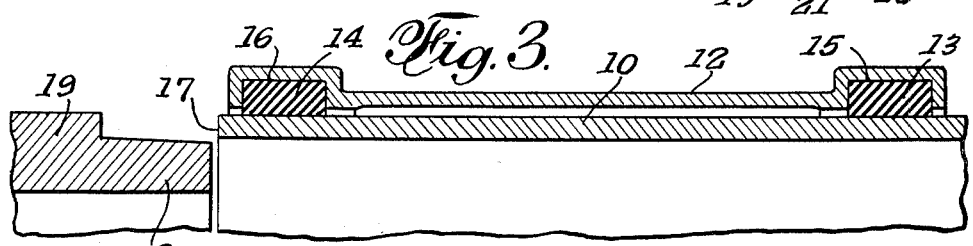
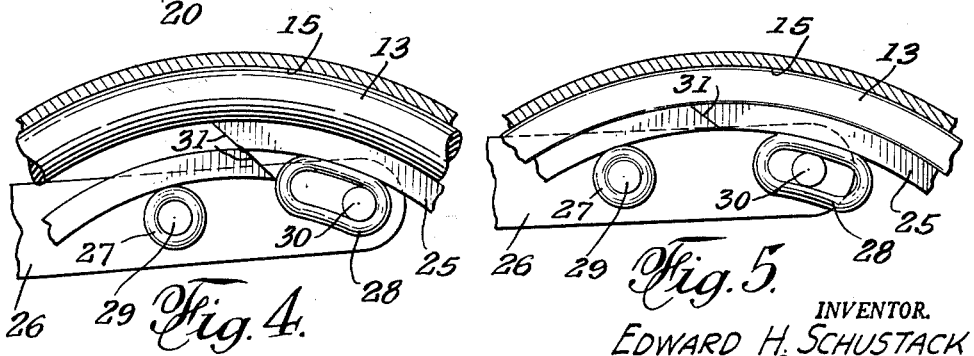
INVENTOR.
EDWARD H. SCHUSTACK
BY C. G. Stratton
ATTORNEY Feb. 9, 1965   E. H. SCHUSTACK   3,168,779
METHOD OF ASSEMBLING PIPE COUPLINGS
Filed April 6, 1964   2 Sheets-Sheet 2
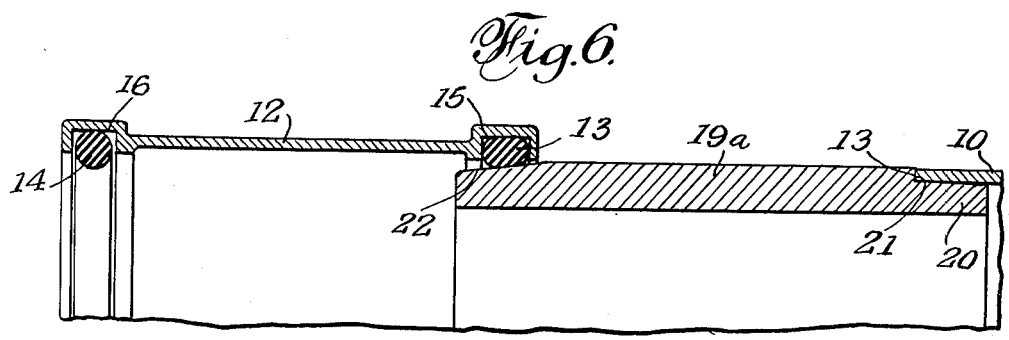
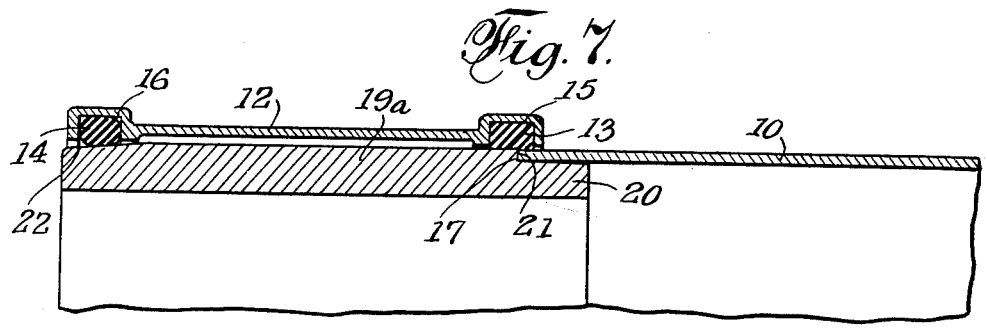
INVENTOR.
EDWARD H. SCHUSTACK
BY
C. G. Stratton
ATTORNEY United States Patent Office 3,168,779
Patented Feb. 9, 1965

3,168,779
METHOD OF ASSEMBLING PIPE COUPLINGS
Edward H. Schustack, 1816 N. Stanley,
Los Angeles, Calif.
Filed Apr. 6, 1964, Ser. No. 358,149
4 Claims. (Cl. 29—450)

This invention relates to a method of assembling pipe couplings that may be used for metal pipe but is especially adapted for connecting pipe sections of asbestos-cement composition, or the like, and known in the trade as cement pipe.

The common way of connecting the adjacent ends of aligned cement pipes is to use a coupling sleeve that loosely fits over said pipe ends and to seal between each pipe end and the sleeve by means of a readily deformable gasket of rubber, synthetic rubber or other suitable resilient material. It is common to house such gaskets in internal grooves in the sleeve and to so compress them as to effect a hydraulic seal that withstands considerable internal pressure in the pipes. Since it is important that the gaskets be under substantial expanding pressure as induced by their engagement with the pipe ends, the same necessarily have a normal inside diameter smaller than the outside diameter of the portions of the pipe around which said gaskets fit. Hence, there is an interference fit between the pipe ends and the gaskets that frequently causes such distortion of the gaskets, when a coupling sleeve is applied, that sealing efficiency is impaired. Cutting, tearing or other mutilation of the gaskets has occurred, the same having the further disadvantage of not showing up until leakage is revealed by hydraulic flow in the pipes.

This fault has been previously recognized and the usual way of lessening the possibility of gasket distortion and/or mutilation is to taper or chamfer the ends of the pipes so that, by causing a gradual compression of the gaskets as the pipe coupling is assembled, the same expand with little or no distortion or mutilation and, therefore, seal effectively. Such chamfers are ordinarily machined on the pipe ends, enormously large lathes being used for this purpose. Thus, these chamfers are provided at high cost. Also, while efficient, as above explained, the tapers yet create considerable friction with the gaskets because there is a rubber-to-cement rubbing contact that, if it can be lubricated at all, can be lubricated only with such limited efficiency as to reduce friction to a small and inconsequential degree.

Recognizing the foregoing and the shortcomings of common assembly practice of gasket-provided couplings, this invention has for an object to provide a novel, simple and improved method for effecting such assembly with pipe ends that are square-ended (their normal condition), thereby obtaining a leak-proof coupling assembly at low cost.

The least costly type of gasket that may be used is the one that has a round cross-section. In an effort to minimize gasket mutilation, even though tapered pipe ends are used, various other cross-sectional gasket forms have been used. Such variations in gasket cross-sectional form impose a further cost that, when added to the cost of machining tapers on the pipe ends, subtantially raises the cost of cement pipe couplings.

Accordingly, another object of the invention is to provide a coupling assembling method that is as effective and efficient with round-sectioned gaskets as with gaskets having special cross-sectional shapes.

This invention has for its object to provide a novel, economical and convenient method or process of superior utility.

The invention also comprises novel combinations of method steps, which will appear more fully in the course of the following description of the present method or process, the same being based on the accompanying drawing. However, the following specification merely discloses preferred embodiments of the present invention, and the same are given by way of example only.

In the drawing, like reference characters designate similar parts in the several views.

FIG. 1 is a side elevational view, in quarter section, of a generally conventional pipe coupling such as is assembled by the present method.

FIG. 2 is an enlarged and fragmentary longitudinal sectional view showing the beginning of the first step of one embodiment of the present method.

FIG. 3 is a similar view showing the completion of the next method step.

FIG. 4 is a fragmentary cross-sectional view showing a preparatory step in the internal expansion of one of the sealing gaskets of the coupling as carried out in an alternate manner to that shown in FIGS. 2 and 3.

FIG. 5 is a similar view showing internal expansion of a gasket by the means used in FIG. 4 and before insertion of a pipe end into the coupling sleeve.

FIG. 6 is a fragmentary longitudinal sectional view showing the beginning of the first step of a modified method, said view being comparable to the first step as illustrated in FIG. 2.

FIG. 7 is a similar view showing a transition position of the means, as in FIG. 6, the same being intermediate the step of FIG. 6 and the next step, as exemplified in FIG. 3.

As shown in FIG. 1, two pipes 10 and 11 are coupled by a sleeve 12, with compressed sealing gaskets 13 and 14 disposed in the respective grooves 15 and 16 formed in the ends of sleeve 12 and in hydraulic sealing contact with the outer faces of the respective pipes 10 and 11. The gaskets, as shown in FIG. 1, have a cross-sectional form that, in part, conform to the shape of grooves 15 and 16 and, in part, conform to the cylindrical outer surface of the respective pipes. The initial cross-sectional shape of each gasket is preferably round, as at the left end of FIGS. 2 and 6, the compressed shape of FIGS. 3 and 7 being shown as substantially rectangular but may vary according to the cross-sectional shape of the mentioned grooves. In practice, the gaskets, when relaxed, have an outer diameter that conforms to the diameter of the groove bottoms, and an inside diameter that is smaller than the outer diameter of the pipes. In this case, whether the pipes 10 and 11 are made of metal, cement or composition, as before indicated, the respective ends 17 and 18 are square-ended, i.e., without taper or chamfer.

The foregoing is generally typical coupling design, except that, as previously explained, the pipe ends 17 and 18 are square-ended rather than tapered.

The method that is illustrated in FIGS. 2 and 3 utilizes a plug 19 that is in the form of a metal ring with a reduced end 20 that slidably fits into pipe 10, as limited by an annular shoulder 21 that abuts pipe end 17, and with a tapered end 22 at the end opposite to the reduced end 20. In practice, the outer size of said ring 19 is somewhat greater than that of pipe 10, although said sizes may be alike, and the slope of tapered end 22 may be as gradual as practicable in preference to an abrupt or sharp taper. Insertion of the plug end 20 into pipe 10 may be facilitated by slightly tapering the same, as shown.

With plug 19 in place on the end of pipe 10 and the taper 22 lubricated, if desired, to minimize friction, the sleeve 12, with two gaskets 13 and 14 in the seats or grooves 15 and 16 thereof, is slipped over said taper, or the taper, by pushing on pipe 10, is introduced into the sleeve. As seen in FIG. 2, the near gasket 13 will be gradually compressed into the groove by expansion of its inner diameter and, in the process, spread until, when the outer cylindrical surface of the plug reaches the gasket, the latter is fully compressed and substantially fills the groove 15. The relative movement of the sleeve and pipe 10 is continued until the plug compresses the gasket 14 as it did the gasket 13. By continuing such relative movement of sleeve and pipe until the pipe end 17 projects beyond the end of the sleeve, the plug 19 may be removed, as shown in FIG. 3, leaving the pipe 10 in position expanding both gaskets 13 and 14. It will be noted that only the taper on plug 19 causes such expansion, the pipe 10 only maintaining the same.

Now, by placing the end 18 of pipe 11 in end abutment with the pipe end 17, the pipes being aligned, of course, the sleeve 12 is either slid over the pipe 11 or the two aligned pipes are moved longitudinally so that pipe 10 is retracted from its fully projected position, while pipe 11 is projected into the sleeve. This achieves the position of FIG. 1 wherein the expanded gasket 13 is engaged around pipe 10 and the expanded gasket 14 around pipe 11. The space shown between the pipe ends 17 and 18 is optional and is achieved by a small relative movement of the pipes after assembly as shown.

It will be evident that the present method entails the expansion of both gaskets of the coupling and maintaining of the expansion by one of the pipes before the other pipe is moved into engagement with the gasket that seals it; also, that both pipe ends may be square-ended and that the plug is re-usable as needed, one plug serving to aid in the connection of the successive couplings of a pipe line.

In the modification of FIGS. 4 and 5, a gasket-expanding ring 25, in collapsed condition as in FIG. 4, is placed within the gasket 13 or 14, as the case may be. Then, by operating a tool 26 to expand said ring, the latter is enlarged to the condition of FIG. 5. Thus, a pipe may be slid into the expanded gasket while displacing the ring 25, which collapses in the process and is ready for re-use. By providing one end of ring 5 with a round eye 27 and the other end with an elongated eye 28, two laterally directed pins 29 and 30 on said tool, engaged in said eyes, may be relatively moved by manipulation of the tool to cause the angled ends 31 of the ring to slidingly engage to spread the ring. One such ring and tool may serve to spread both gaskets in the sleeve, one after the other. It will be evident that the present method may be carried out with the means shown in FIGS. 4 and 5. Also, any sectional or segmental means capable of being spread to cause expansion of the gaskets 13 and 14 will serve in the present connection.

It will be noted that the method which is described in connection with FIGS. 2 and 3 provides for insertion of the end 17 of pipe 10 into the gasket 13 before the gasket 14 has been expanded. This is due to the use of a relatively short gasket-expanding plug 19a.

The method illustrated in the embodiment of FIGS. 6 and 7 provides for insertion of the pipe end 17 into the gasket 13 after the gasket 14 has been expanded. Thus, both gaskets 13 and 14 are held expanded by the plug 19a before the pipe end 17 achieves expanding engagement with the gasket 13. This transition position is shown in FIG. 7. It will be clear that, as the pipe 10 is moved further into the sleeve 12 or the sleeve is slid further onto pipe 10, said pipe will be positioned, as in FIG. 3, with the plug 19 wholly removed from engagement with the gasket 14.

The method is completed as described above respecting the alignment of pipes 10 and 11 and relative movement of the sleeve and said aligned pipes.

It will be evident that the present method is efficient regardless of the particular cross-sectional form of the gaskets.

This application is a continuation-in-part of my pending application, Serial No. 54,113, now abandoned, bearing the same title.

While the foregoing discloses what is now contemplated to be the best mode of carrying out the invention, the same is, of course, subject to modification without departing from the spirit and scope of the invention. Therefore, it is not desired to restrict the invention to the particular method steps or combination or sequence of method steps described, but to cover all equivalent steps or methods that may fall within the scope of the appended claims.

Having thus described the invention, what is claimed and desired to be secured by Letters Patent is:

1. The method of assembling a coupling sleeve over the adjacent ends of two pipes, the sleeve being provided with two annular gaskets that are disposed in inwardly open and longitudinally spaced annular grooves and are adapted to seal around the respective pipes, said method consisting in first expanding the inner diameter of one gasket while simultaneously radially compressing the same into its groove and then expanding the inner diameter of the other gasket while simultaneously radially compressing the same into its groove while retaining the initial longitudinal spacing of the two gaskets, inserting the end of one pipe into the first-expanded gasket and then into the other gasket so that said one pipe maintains both longitudinally spaced gaskets expanded, placing the end of the other pipe in abutment against the mentioned end of the first pipe, and, finally, moving the sleeve together with the longitudinally spaced gaskets with their increased inner diameter and radial compression into said grooves relatively to the abutted pipes to slidingly retract the first pipe from engagement by said other gasket and slidingly project said other pipe through the latter gasket to bring the abutted ends of the two pipes to a position intermediate the gaskets.

2. The method of assembling a coupling sleeve over the adjacent ends of two pipes, the sleeve being provided with two annular gaskets that are disposed in inwardly open and longitudinally spaced annular grooves and are adapted to seal around the respective pipes, and in which both pipe ends have end faces that are normal to the pipe axes and the outer cylindrical faces of said pipes terminate at said ends, said method consisting in first expanding the inner diameter of one gasket to a size approximating the outer diametral size of the pipes while simultaneously radially compressing the same into its groove and then similarly expanding the inner diameter of the other gasket while simultaneously radially compressing the same into its groove while retaining the initial longitudinal spacing of the two gaskets, inserting the end of one pipe into the first-expanded gasket and then into the other gasket so that said one pipe maintains both longitudinally spaced gaskets expanded, placing the end of the other pipe in abutment against the mentioned end of the first pipe, and, finally, moving the sleeve together with the longitudinally spaced gaskets with their increased inner diameter and radial compression into said grooves relatively to the abutted pipes to slidingly retract the first pipe from engagement by said other gasket and slidingly project said other pipe through the latter gasket to bring the abutted ends of the two pipes to a position intermediate the gaskets.

3. The method of assembling a coupling sleeve over the adjacent ends of two pipes, the sleeve being provided with two annular gaskets that are disposed in inwardly open and longitudinally spaced annular grooves and are adapted to seal around the respective pipes, said method consisting in first expanding the inner diameter of one gasket while simultaneously radially compressing the same into its groove and then expanding the inner diameter of the other gasket while simultaneously radially compressing the same into its groove while retaining the initial longitudinal spacing of the two gaskets, inserting the end of one pipe into the first-expanded gasket before the second gasket has been expanded, and then into the other gasket so that said one pipe maintains both longitudinally spaced gaskets expanded, placing the end of the other pipe in abutment against the mentioned end of the first pipe, and, finally, moving the sleeve together with the longitudinally spaced gaskets with their increased inner diameter and radial compression into said grooves relatively to the abutted pipes to slidingly retract the first pipe from engagement by said other gasket and slidingly project said other pipe through the latter gasket to bring the abutted ends of the two pipes to a position intermediate the gaskets.

4. The method of assembling a coupling sleeve over the adjacent ends of two pipes, the sleeve being provided with two annular gaskets that are disposed in inwardly open and longitudinally spaced annular grooves and are adapted to seal around the respective pipes, and in which both pipe ends have end faces that are normal to the pipe axes and the outer cylindrical faces of said pipes terminate at said ends, said method consisting in first expanding the inner diameter of one gasket to a size approximating the outer diametral size of the pipes while simultaneuosly radially compressing the same into its groove and then similarly expanding the inner diameter of the other gasket while simultaneously radially compressing the same into its groove while retaining the initial longitudinal spacing of the two gaskets, inserting the end of one pipe into the first-expanded gasket before the second gasket has been expanded, and then into the other gasket so that said one pipe maintains both longitudinally spaced gaskets expanded, placing the end of the other pipe in abutment against the mentioned end of the first pipe, and, finally, moving the sleeve together with the longitudinally spaced gaskets with their increased inner diameter and radial compression into said grooves relatively to the abutted pipes to slidingly retract the first pipe from engagement by said other gasket and slidingly project said other pipe through the latter gasket to bring the abutted ends of the two pipes to a position intermediate the gaskets.

References Cited in the file of this patent
UNITED STATES PATENTS

| | | |
|---|---|---|
| 2,146,641 | McWane | Feb. 7, 1939 |
| 2,329,000 | Rembert | Sept. 7, 1943 |
| 2,738,992 | Heisler | Mar. 20, 1956 |
| 2,914,347 | Magnani | Nov. 24, 1959 |
| 3,120,967 | Kazienko | Feb. 11, 1964 |